(12) United States Patent
Huston, III et al.

(10) Patent No.: US 11,516,206 B2
(45) Date of Patent: Nov. 29, 2022

(54) CYBERSECURITY SYSTEM HAVING DIGITAL CERTIFICATE REPUTATION SYSTEM

(71) Applicant: Forcepoint, LLC, Austin, TX (US)

(72) Inventors: Lawrence Bruce Huston, III, Ann Arbor, MI (US); David Coffey, Austin, TX (US)

(73) Assignee: Forcepoint LLC, Austin, TX (US)

( * ) Notice: Subject to any disclaimer, the term of this patent is extended or adjusted under 35 U.S.C. 154(b) by 102 days.

(21) Appl. No.: 16/865,176

(22) Filed: May 1, 2020

(65) Prior Publication Data
US 2021/0344667 A1 Nov. 4, 2021

(51) Int. Cl.
*H04L 29/00* (2006.01)
*H04L 9/40* (2022.01)

(52) U.S. Cl.
CPC ...... *H04L 63/0823* (2013.01); *H04L 63/1425* (2013.01); *H04L 63/20* (2013.01)

(58) Field of Classification Search
CPC . H04L 63/0823; H04L 63/1425; H04L 63/20; H04L 29/06578; H04L 29/06986; H04L 63/0227; H04L 63/0254; G06F 21/10
See application file for complete search history.

(56) References Cited

U.S. PATENT DOCUMENTS

| 6,072,875 | A | 6/2000 | Tsudik |
| 6,678,693 | B1 | 1/2004 | Shiraishi |
| 7,107,447 | B2 | 9/2006 | Sanin et al. |
| 7,694,150 | B1 | 4/2010 | Kirby |
| 7,725,565 | B2 | 5/2010 | Li et al. |
| 7,813,944 | B1 | 10/2010 | Luk et al. |
| 7,933,960 | B2 | 4/2011 | Chen et al. |

(Continued)

FOREIGN PATENT DOCUMENTS

WO    WO-2019153581 A1    8/2019

OTHER PUBLICATIONS

Marinescu, Dan C., Cloud Computing and Computer Clouds, University of Central Florida, 2012, pp. 1-246.

(Continued)

*Primary Examiner* — Brandon Hoffman
*Assistant Examiner* — Helai Salehi
(74) *Attorney, Agent, or Firm* — Terrile, Cannatti & Chambers; Stephen A. Terrile

(57) ABSTRACT

A system, method, and computer-readable medium are disclosed for implementing a cybersecurity system having a digital certificate reputation system. At least one embodiment is directed to a computer-implemented method executing operations including receiving a communication having an internet protocol (IP) address and a digital certificate at a device within the secured network; determining whether the IP address is identified as having a high-security risk level; if the IP address has a high-security risk level, assigning a security risk level to the digital certificate based on the security risk level of the IP address; and using the security risk level for the digital certificate in executing the one or more security policies. Other embodiments include corresponding computer systems, apparatus, and computer programs recorded on one or more computer storage devices.

17 Claims, 7 Drawing Sheets

(56) References Cited

U.S. PATENT DOCUMENTS

| | | |
|---|---|---|
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Allen et al. |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukeiji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,713,934 B2 | 7/2020 | Sayavong et al. |
| 10,769,908 B1 | 9/2020 | Burris et al. |
| 10,917,319 B2 | 2/2021 | Scheib et al. |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1 | 12/2009 | Kaurmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Tekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1 | 12/2015 | Eden et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |

(56) References Cited

U.S. PATENT DOCUMENTS

| | | |
|---|---|---|
| 2016/0092774 A1 | 3/2016 | Wang et al. |
| 2016/0105334 A1 | 4/2016 | Boe et al. |
| 2016/0117937 A1 | 4/2016 | Penders et al. |
| 2016/0147380 A1 | 5/2016 | Coates et al. |
| 2016/0164922 A1 | 6/2016 | Boss et al. |
| 2016/0182492 A1* | 6/2016 | Bean .................. H04L 63/0823 713/156 |
| 2016/0224803 A1 | 8/2016 | Frank et al. |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1 | 11/2016 | Mehrabanzad et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0171609 A1 | 6/2017 | Koh |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez Del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0150570 A1 | 5/2018 | Broyd et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0276541 A1 | 9/2018 | Studnitzer et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0034813 A1 | 1/2019 | Das et al. |
| 2019/0036969 A1 | 1/2019 | Swafford et al. |
| 2019/0052660 A1 | 2/2019 | Cassidy et al. |
| 2019/0095478 A1 | 3/2019 | Tankersley et al. |
| 2019/0158503 A1 | 5/2019 | Bansal et al. |
| 2019/0174319 A1 | 6/2019 | Backholm et al. |
| 2019/0222603 A1 | 7/2019 | Yang |
| 2019/0289021 A1 | 9/2019 | Ford |
| 2019/0294482 A1 | 9/2019 | Li et al. |
| 2019/0311105 A1 | 10/2019 | Beiter et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | DeLuca et al. |
| 2020/0034462 A1 | 1/2020 | Narayanaswamy et al. |
| 2020/0036740 A1 | 1/2020 | Ford |
| 2020/0065728 A1 | 2/2020 | Wilson et al. |
| 2020/0077265 A1 | 3/2020 | Singh et al. |
| 2020/0089692 A1 | 3/2020 | Tripathi et al. |
| 2020/0117546 A1 | 4/2020 | Wong et al. |
| 2020/0287888 A1* | 9/2020 | Moore ................ H04L 63/0227 |
| 2020/0334025 A1 | 10/2020 | Wang et al. |

OTHER PUBLICATIONS

Singh et al., Container-Based Microservice Architecture for Cloud Applications, International Conference on Computing, Communication and Automation (ICCCA2017), 2017.

Barrere et al., Vulnerability Assessment in Autonomic Networks and Services: A Survey, IEEE, Aug. 30, 2013, vol. 16, issue. 2, pp. 988-1004.

Burns et al., Automatic Management of Network Security Policy, IEEE, Jun. 14, 2001, pp. 12-26.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Sanjeev Goyal et al., Attack, Defence and Contagion in Networks, The Review of Economic Studies, vol. 81, Issue 4, Oct. 2014, pp. 1518-1542, https://doi.org/10.1093/restud/rdu013 (2014).

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Tech-

(56) References Cited

OTHER PUBLICATIONS nology; Ubiquitous Computing and Communications; Dependable, Automatic and Secure Computing Persuasive Intelligence and Computing, pp. 1711-1717, Dec. 2015.
Mesaros et al., Latent Semantic Analysis in Sound Event Detection, 19th European Signal Processing Conference (EUSIPCO 2011), pp. 1307-1311, 2011.
Crandall et al., Inferring Social Ties from Geographic Coincidences, PNAS, vol. 107, No. 52, 2010, pp. 22436-22441, 2010.
Ross et al., Bully Prevention in Positive Behavior Support, Journal of Applied Behavior Analysis, 42(4), pp. 747-759, 2009.
Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.
GITHUB, The Z3 Theorem Prover, retrieved from internet May 19, 2020, https://github.com/Z3Prover/z3.
John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

* cited by examiner

CYBERSECURITY SYSTEM HAVING DIGITAL CERTIFICATE REPUTATION SYSTEM

BACKGROUND OF THE INVENTION

Field of the Invention

The present disclosure relates in general to the field of computers and similar technologies, and in particular to cybersecurity systems utilized in this field. Still more particularly, the disclosure relates to a method, system, and computer-usable medium for assessing security risks for Internet Protocol (IP) addresses using security risk assessments associated with corresponding digital certificates.

Description of the Related Art

Users interact with physical, system, data, and services resources of all kinds, as well as each other, on a daily basis. Each of these interactions, whether accidental or intended, poses some degree of security risk. As an example, security risks are present anytime two or more devices communicate with one another over, for example, the Internet. It is often difficult to discern whether a device is communicating with a trusted site or a malicious site. Lists of malicious IP addresses may be published and used in security policies to prevent communication with malicious sites having those IP addresses.

SUMMARY OF THE INVENTION

A system of one or more computers can be configured to perform particular operations or actions by virtue of having software, firmware, hardware, or a combination of them installed on the system that in operation causes or cause the system to implement a cybersecurity system having a digital certificate reputation system. One general aspect includes a computer-implemented method for executing one or more security policies in a secured network. The computer-implemented method includes receiving a communication including an Internet Protocol (IP) address and a digital certificate at a device within the secured network; determining whether the IP address is identified as having a high security risk level; if the IP address has a high-security risk level, assigning a security risk level to the digital certificate based on the security risk level of the IP address; and using the security risk level for the digital certificate in executing the one or more security policies. Other embodiments of this aspect include corresponding computer systems, apparatus, and computer programs recorded on one or more computer storage devices, each configured to perform the actions of the methods.

Another embodiment is directed to a system including one or more information handling systems, where the one or more information handling systems include: a processor; a data bus coupled to the processor; and a non-transitory, computer-readable storage medium embodying computer program code, the non-transitory, computer-readable storage medium being coupled to the data bus; where the computer program code included in one or more of the information handling systems is executable by the processor of the information handling system so that the information handling system, alone or in combination with other information handling systems, executes operations including: receiving a communication including an Internet Protocol ((IP) address and a digital certificate at a device within the secured network; determining whether the IP address is identified as having a high security risk level; if the IP address has a high-security risk level, assigning a security risk level to the digital certificate based on the security risk level of the IP address; and using the security risk level for the digital certificate in executing the one or more security policies.

Another embodiment is directed to a non-transitory, computer-readable storage medium embodying computer program code comprising executable instructions configured for: receiving a communication including an Internet Protocol ((IP) address and a digital certificate at a device within the secured network; determining whether the ip address is identified as having a high security risk level; if the IP address has a high-security risk level, assigning a security risk level to the digital certificate based on the security risk level of the IP address; and using the security risk level for the digital certificate in executing the one or more security policies.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
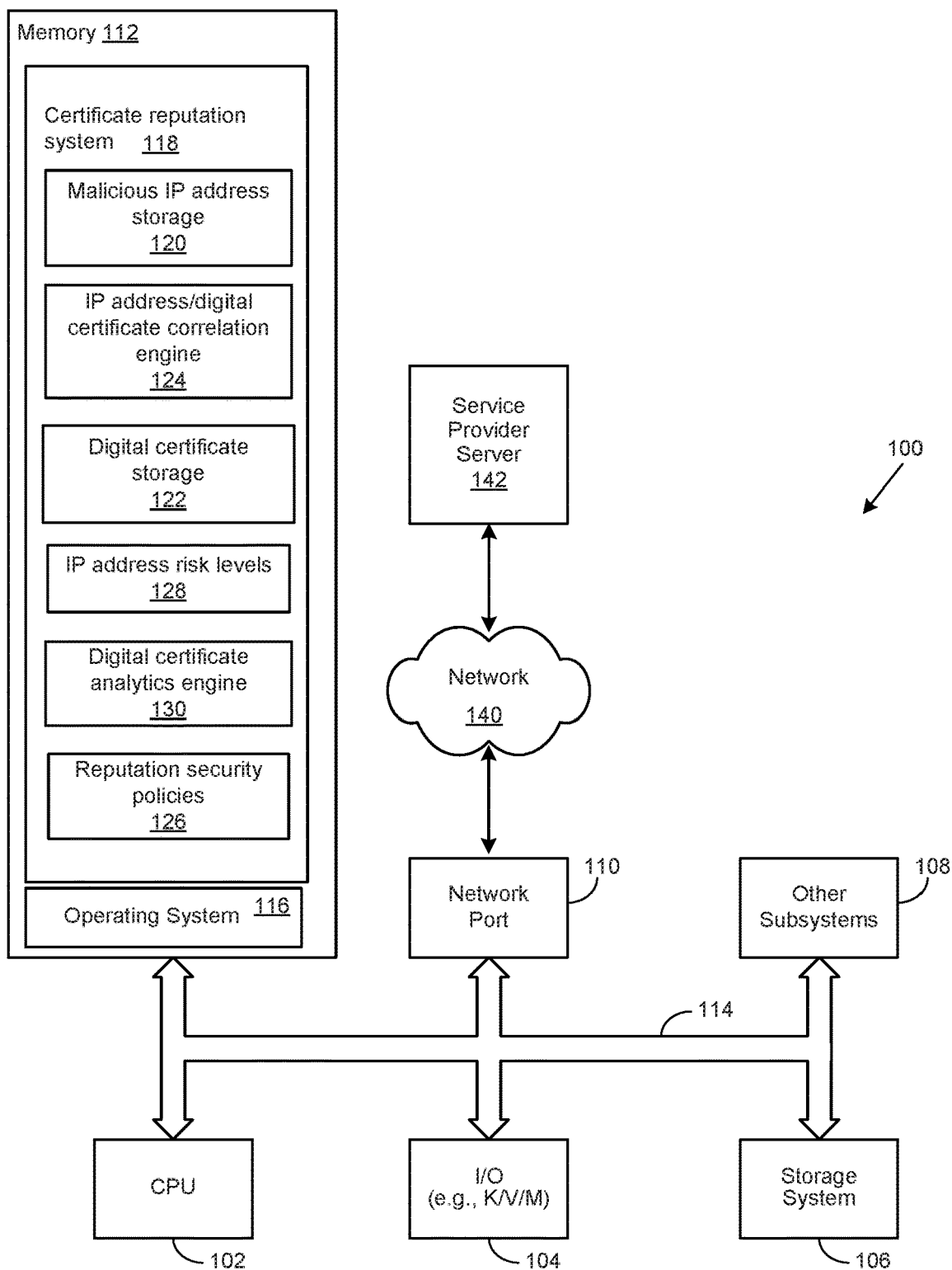
FIG. 1 depicts an exemplary client computer in which the disclosed system may be implemented.

A method, system, and computer-usable medium are disclosed for implementing a cybersecurity system having a digital certificate reputation system that may be used to identify malicious and questionable IP addresses. Certain embodiments of the present disclosure recognize that communications with an IP address can be blocked or limited if the IP address is known to be associated with a malicious site. However, certain embodiments also recognize that many malicious sites (phishing, malware hosting, etc.) frequently change IP addresses. Using techniques like IP address reputation (e.g., blacklisting, graylisting, etc.) falls behind bad actors since the bad actors often change their IP addresses.

Signing malicious code with valid digital certificates is a helpful trick used by attackers to maximize the odds that malware won't be flagged by antivirus solutions and often even by network security appliances. Digitally signed malware can also bypass OS protection mechanisms that install or launch only programs with valid signatures.

Certain embodiments of the present disclosure are implemented with the recognition that digital certificates used in communication with disreputable IP addresses may also be used by an IP address that has been changed by a bad actor, thereby providing one manner of more quickly tracking potentially malicious IP addresses. That is, if a digital certificate has been previously submitted by a malicious IP address, another IP address using the same certificate may present a higher risk that the IP address is malicious and can be treated as such in the security policy of a device or network.

Digital certificates are electronic credentials that bind the identity of the certificate owner to a pair of electronic encryption keys, (one public and one private), that can be used to encrypt and sign information digitally. The main purpose of the digital certificate is to ensure that the public key contained in the digital certificate belongs to the entity to which the certificate was issued. In other words, the digital certificate is used to verify that a person sending a message is who he or she claims to be. The message receiver is thus provided with a public key which the receiver can use to encode a replies back to the sender.

Certain embodiments of the disclosed system also recognize that digital certificates provided from a malicious site may appear to be certified by a valid source, but have inconsistencies that make the digital certificate and corresponding IP addresses questionable. IP addresses using digital certificates having such inconsistencies should be subject to further scrutiny and security policies may be placed in effect that treat the corresponding IP address with a certain degree of caution.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a trackpad, a touchscreen and a display device (including a touch-sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid-state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes an operating system (OS) 116 and, in various embodiments, may also include a certificate reputation system 118. In one embodiment, the information handling system 100 is able to download the certificate reputation system 118 from the service provider server 142. In another embodiment, the certificate reputation system 118 is provided as a service from the service provider server 142.

In various embodiments, the certificate reputation system 118 performs a security protection operation. In certain embodiments, the certificate reputation system 118 improves processor efficiency, and thus the efficiency of the information handling system 100, by facilitating security protection functions. Additionally, the certificate reputation system 118 provides a way of protecting a network system against security threats, thereby enhancing the operation of the network. As will be appreciated, once the information handling system 100 is configured to perform the certificate reputation analysis operations, the information handling system 100 becomes a specialized computing device specifically configured to protect the information handling system 100 and/or a network connected to the information handling system 100 against security threats and is not a general-purpose computing device. Moreover, the implementation of the certificate reputation system 118 on the information handling system 100 improves the functionality of the information handling system 100, providing a useful and concrete result of performing security analytics functions to mitigate security risk.

In certain embodiments, the certificate reputation system 118 includes various components that are used to assign a security risk level to an IP address based on the reputation of the digital certificate using the IP address. In certain embodiments, the certificate reputation system 118 also includes components that are used to check the integrity of the digital certificate and assign a security risk level to the digital certificate. In certain embodiments, digital certificates that may have been compromised may be compared with other digital certificates to assign security risk levels to other digital certificates having the same or similar properties. In certain embodiments, the security risk level of a digital certificate that may have been compromised may be used to assign a corresponding risk level to an IP address using the digital certificate.

As used herein, security risk levels may be expressed in various forms. In one example, security risk levels may be assigned using a function in which the security risk level is located on a generally continuous spectrum of security risk levels. In another example, security risk levels may be assigned using integer values. In another example, security risk levels may be in a binary format where, for example, a true value indicates a high-security risk level, and a false value indicates that the corresponding element does not pose any significant security risk. In another example, security risk levels are binned by, for example, high-security risk, medium-security risk, and low-security risk. It will be recognized in view of the teachings of the present disclosure that various systems may be used individually and/or combined to assign security risk levels to an item.

In certain embodiments, the certificate reputation system 118 includes a plurality of software engines, modules, and datastores that combine to form a system that is capable of assigning security levels to IP addresses based on the digital certificate used by the IP address. In the example shown in FIG. 1, the certificate reputation system 118 includes malicious IP address storage 120. In certain embodiments, the malicious IP address storage 120 includes IP addresses that are known to be associated with a malicious entity. In certain embodiments, the malicious IP address storage 120 may include IP addresses that have been blacklisted and/or greylisted. In certain embodiments, IP addresses in the malicious IP address storage are those that have been provided from an external source tasked with identifying malicious entities. In certain embodiments, the malicious IP address storage 120 may also include IP addresses that have been blacklisted and/or greylisted by the security policies associated with the certificate reputation system 118.

Certain embodiments include digital certificate storage 122. The digital certificate storage 122 may include digital certificates known to be associated with reputable IP addresses as well as digital certificates received from a previously unknown IP address. In certain embodiments, the digital certificate storage 122 may include security risk levels associated with one or more of the stored digital certificates. As explained in further detail herein, the security risk levels assigned to digital certificates in the digital certificate storage 122 may be based on the security risk level of the IP addresses using the digital certificates. Additionally, or on the alternative, the security risk levels assigned to the digital certificates in the digital certificate storage 122 may be based on whether the digital certificate has one or more features in common with a digital certificate that may have been compromised.

In certain embodiments, the IP address and digital certificate received by the information handling system 100 are correlated with one another at an IP address/digital certificate correlation engine 124. In certain embodiments, the correlation engine 124 compares the IP address received in the communication with IP addresses in the malicious IP address storage 120. If the IP address is associated with a malicious entity as per the malicious IP address storage, the corresponding digital certificate is assigned an elevated security risk level as determined by the reputation security policies 126 that are executed by the certificate reputation system 118. In certain embodiments, the digital certificate from the malicious IP address is stored along with its corresponding security risk level in digital certificates storage 122.

In certain embodiments, if the IP address used in a communication is an IP address that is not found in the malicious IP address storage 120, the IP address/digital certificate correlation engine 124 checks whether the corresponding digital certificate has an elevated security risk level as identified in digital certificates storage 122 (e.g., whether the digital certificate was previously used in conjunction with a malicious or high-risk IP address). If the digital certificate has an elevated security risk level, the IP address using the digital certificate may be assigned an elevated security risk level as per reputation security policies 126. IP addresses and their corresponding security risk levels may be stored for further use in an IP address risk level datastore 128. Additionally, or in the alternative, IP addresses using digital certificates that have been previously associated with malicious IP addresses may be stored in the malicious IP address storage 120 depending on reputation security policies 126.

In certain embodiments, a communication using an IP address having an elevated security risk level (as found in IP address risk level datastore 128) may include a digital certificate having an elevated security risk level. In such instances, the communications are handled using reputation security policies 126 associated with a mixed IP address/digital certificate security risks. In certain embodiments, the security policies may assign different weights to the security risk levels of the IP address and digital certificate to determine the appropriate security response to the communication.

In certain embodiments, security risk levels for IP addresses and digital certificates dynamically change as new IP addresses, and new digital certificates are identified in communications received at the information handling system 100. As an example, if a given digital certificate is used by multiple malicious IP addresses, the digital certificate may be given a higher security risk level than a digital certificate that has only been used by one malicious IP address. As a further example, if an IP address has been associated with more than one digital certificate having an elevated security risk level, the IP address may be assigned a higher security risk level than an IP address that has been associated with only one digital certificate having an elevated security risk.

Certain embodiments of the disclosed system include a digital certificate analytics engine 130. In certain embodiments, the digital certificate analytics engine 130 is configured to analyze the contents of digital certificates to determine whether they are counterfeit, or, alternatively, authorized by a reputable certificate authority (CA).

As noted herein, digital certificates are electronic credentials that bind the identity of the certificate owner to a pair of electronic encryption keys, (one public and one private), that can be used to encrypt and sign information digitally. The main purpose of the digital certificate is to ensure that the public key contained in the certificate belongs to the entity to which the certificate was issued, in other words, to verify that a person sending a message is who he or she claims to be, and to then provide the message receiver with the means to encode a reply back to the sender.

Encryption techniques using public and private keys require a public-key infrastructure (PKI) to support the distribution and identification of public keys. Messages can be encrypted with either the public or the private key and then decrypted with the other key. Without certificates, one could send data encrypted with the private key and the public key would be used to decrypt the data, but there would be no assurance that the data was originated by anyone in particular. All the receiver would know is that a valid key pair was used. In essence, a Certificate Authority or CA then is a commonly trusted third party that is relied upon to verify the matching of public keys to identity, e-mail name, or other such information.

The most common digital certificate content complies with the X.509 certificates standard, which includes:

Information about the subject a.k.a. Subject Name—"subject" refers to the site represented by the certificate.

Information about the certificate issuer/certificate authority (CA)—The CA is the body that issued and signed the certificate.

Serial number—this is the serial number assigned by the issuer to this certificate. Each issuer must make sure each certificate it issues has a unique serial number.

Version—the X.509 version used by a given certificate.

Validity period—The validity period defines the period over which the certificate can still be deemed trustworthy.

Signature—This is the digital signature of the entire digital certificate, generated using the certificate issuer's private key.

Signature algorithm—The cryptographic signature algorithm used to generate the digital signature (e.g., SHA-1 with RSA Encryption).

Public key information—Information about the subject's public key. This includes:
the algorithm (e.g., Elliptic Curve Public Key),
the key size (e.g., 256 bits),
the key usage (e.g., can encrypt, verify, derive), and
the public key itself.

In theory, CAs are supposed to exercise due diligence before signing digital certificates submitted to them. The CAs need to verify first whether the information placed on the digital certificates are, in fact, true. This is important because their attestation would, later on, serve as the sole basis that certain websites that are able to present certificates signed by them can be trusted.

A given digital certificate is to be issued to a single entity. However, certain aspects of the disclosed system recognize that there are CAs that issue a digital certificate to a reputable entity, but also issue the same digital certificate to a malicious entity. In certain embodiments, digital certificates that are previously used by malicious IP addresses may be checked to determine whether the digital certificates are indeed valid. If a valid digital certificate is used by a malicious IP address as well as by a known reputable IP address, the valid digital certificate may have been improperly copied or improperly issued to multiple entities and may be treated as such based on reputation security policies 126. In such instances, although the digital certificate itself is valid, the fact that it is also used by a malicious entity indicates that IP addresses using the otherwise valid digital certificate likely present high-security risks.

In certain instances, digital signatures issued by a particular CA may not be backed by a thorough due diligence review of the entity to which the digital certificate issues. The CA, therefore, cannot be trusted to reliably issue its digital certificates to reputable entities. If a digital certificate signed by the CA is used in conjunction with a malicious IP address, then the CA may not be conducting proper due diligence review, and digital certificates issued by the CA present a high-security risk. In certain embodiments, once a digital certificate issued by a given CA is used in conjunction with a malicious IP address, the digital certificate analytics engine 130 may search the digital certificates storage 122 and identify all other digital certificates issued by the given CA. Depending on the reputation security policies 126, the security risk level of all digital certificates issued by the given CA may be elevated.

In certain embodiments, the digital certificate analytics engine 130 may analyze the digital certificates in digital certificates storage 122 to determine whether certificates used by a malicious IP address have characteristics that are similar to other digital certificates in digital certificates storage 122. Digital certificates having characteristics similar to digital certificates used by a malicious IP address may have their security risk level elevated even though the identified digital certificates themselves have not been used by a malicious IP address.

The digital certificate analytics engine 130 may execute a wide range of operations designed to identify digital certificates having characteristics that are common to a digital certificate used by a malicious IP address. Accordingly, the foregoing examples of digital certificate analytics executed by the digital certificate analytics engine 130 are merely examples that are not intended to impose limits on all of the various digital certificate analytics operations that may be executed by the disclosed system.

Figure 2:
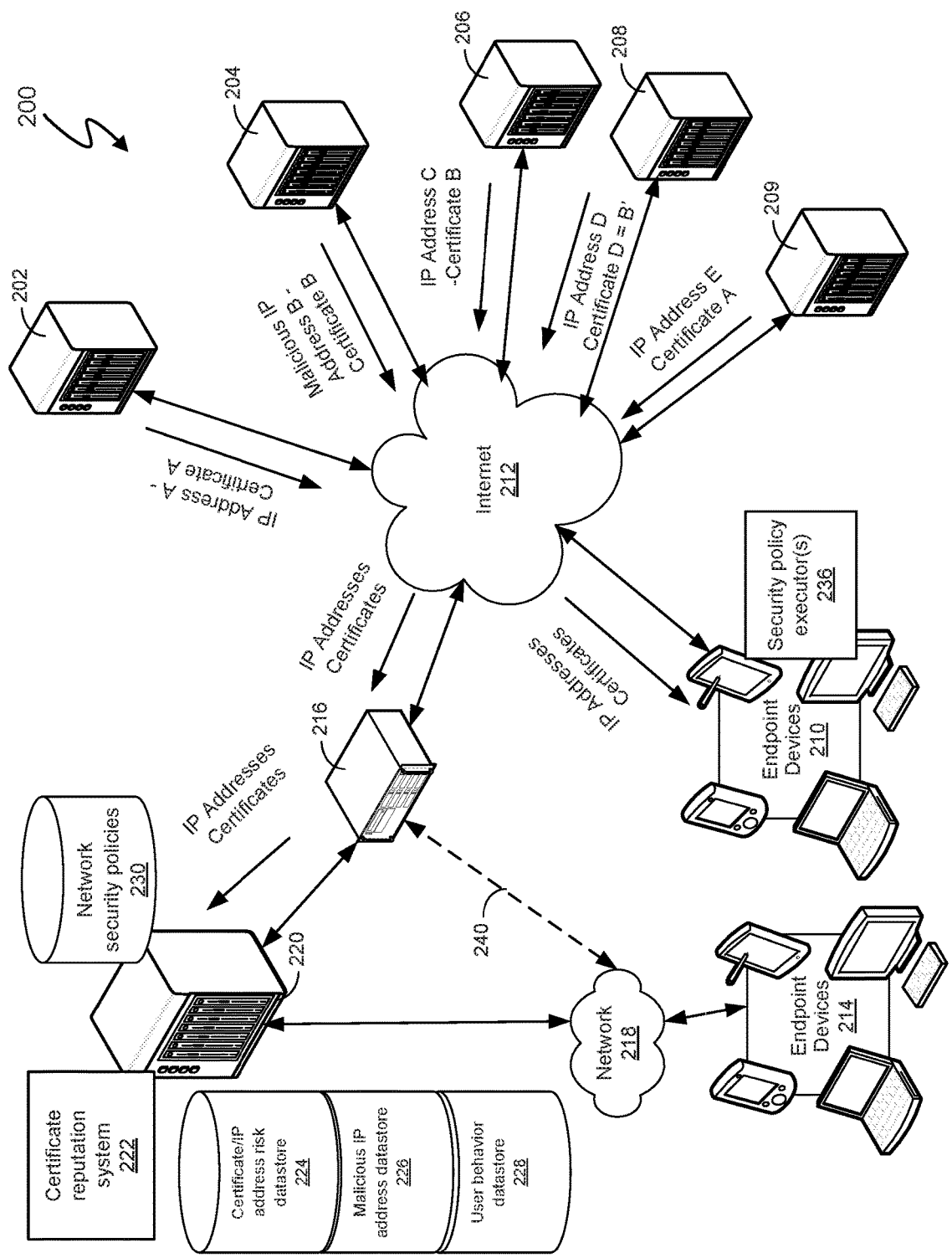
FIG. 2 shows an electronic environment in which certain embodiments of the disclosed system may operate.

FIG. 2 shows an electronic environment 200 in which certain embodiments of the disclosed system may operate. The example shown in FIG. 2 includes a plurality of servers 202, 204, 206, 208, and 209 that are in direct communication with endpoint devices 210 over the Internet 212. Further, servers 202, 204, 206, 208, and 209 are in indirect communication with endpoint devices 214 over the Internet 212. More particularly, in the example shown in FIG. 2, communications from servers 202, 204, 206, 208, and 209 are sent over the Internet 212 to an edge device 216 of a network 218. In at least one embodiment, the edge device 216 sends communications received over the Internet 212 to a system server 220 that is configured to execute a certificate reputation system 222. The certificate reputation system 222 in the illustrated embodiment has access to a certificate/IP address risk datastore 224, a malicious IP address datastore 226, and an optional user behavior datastore 228. Additionally, or in the alternative, the certificate reputation system 222 may be executed by the edge device 216.

In certain embodiments, the user behavior datastore 228 includes security risk levels associated with users of the network system. The security risk levels may be based on observation of deviations of a user interactions with the network system from a user's baseline behaviors. As one example, a user may typically access the network 218 during a particular time of day. When that same user accesses the network 218 at a different time, the deviation may be flagged as a potential security risk indicative of the mindset of the user. Similarly, if the user begins accessing system files that the user does not normally access, the deviation may be flagged as a potential security risk indicative of the mindset of the user. It will be recognized, in view of the teachings of the present disclosure, that a wide range of user behaviors may be employed to establish user behavior security risk levels for users of the network 218.

Servers 202, 204, 206, 208, and 209 communicate with the server 220 through edge device 216 using their IP addresses and corresponding digital certificates. The IP addresses and digital certificates are communicated to the edge device 216, which communicates the IP addresses and digital certificates to the server 220 that executes the certificate reputation system 222.

As shown, server 202 uses IP address A and Certificate A in the communications sent to the edge device 216. In certain embodiments, the edge device 216 forwards packets from IP address A to the certificate reputation system 222. In this example, it is assumed that IP address A is not identified as a malicious IP address in the malicious IP address datastore 226. Further, it is assumed that Certificate A has not previously been used with a malicious IP address. As such, certain embodiments of the certificate reputation system 222 may pass communications from a server 202 to a targeted device of endpoint devices 214 without elevating the security risk level for either IP address A or digital certificate A. As such, communications from a server 202 are forwarded to the targeted device in accordance with the established policies stored in the network security policies datastore 230.

In the illustrated example, server 204 uses IP address B and Certificate B in the communications sent to the edge device 216. In certain embodiments, the edge device 216 forwards packets from IP address B to the certificate reputation system 222. In this example, it is assumed that IP address B is identified as a malicious IP address in the malicious IP address datastore 226. Further, it is assumed that Certificate B has not previously been used with a malicious IP address. As such, certain embodiments of the certificate reputation system 222 may elevate the security risk level associated with Certificate B so that future communications using Certificate B may be subject to higher scrutiny using the network security policies. In certain embodiments, all communications from a server 204 using IP address B are prevented from reaching the targeted endpoint device. Certificate B may be stored along with its elevated security risk level in the certificate/IP address risk datastore 224.

In the illustrated example, server 206 uses IP address C and Certificate B in the communications sent to the edge device 216. In certain embodiments, the edge device 216 forwards packets with IP address C to the certificate reputation system 222. In this example, it is assumed that IP address C has not been previously identified as a malicious IP address in the malicious IP address datastore 226. However, the certificate reputation system 222 accesses the certificate/IP address risk datastore 224 and finds that Certificate B has previously been used with a malicious IP address (IP address B). As such, there is a likelihood that communications from IP address C are also associated with a malicious entity. In certain embodiments, the certificate reputation system 222 elevates the security risk level of IP address C and, depending on the reputation security policies implemented by the certificate reputation system 222, places IP address C in the malicious IP address datastore 226. Communications from server 206 may be intercepted at server 220 or selectively forwarded to one or more of the targeted endpoint devices 214 in accordance with the established policies stored in the network security policies datastore 230.

As further shown in the illustrated example, server 208 uses IP address D and Certificate D in the communications sent to the edge device 216. In certain embodiments, the edge device 216 forwards packets with IP address D to the certificate reputation system 222. In this example, it is assumed that IP address D has not been previously identified as a malicious IP address in the malicious IP address datastore 226. However, the certificate reputation system 222 accesses the certificate/IP address risk datastore 224 and finds that Certificate D has characteristics in common with Certificate B. For example, Certificate B and Certificate D may both be signed by an untrustworthy CA. As such, there is a possibility that communications from IP address D are associated with a malicious entity. In certain embodiments, the certificate reputation system 222 elevates the security risk level of IP address D and, depending on the reputation security policies implemented by the certificate reputation system 222, places IP address D in the malicious IP address datastore 226. Further, Certificate D may be stored with an elevated security risk level in certificate/IP address risk datastore 224. Communications from server 208 may be intercepted at server 220 or selectively forwarded to one or more of the targeted endpoint devices 214 in accordance with the established policies stored in the network security policies datastore 230.

As further shown in the illustrated example, server 209 uses IP address E and Certificate A in the communications sent to the edge device 216. In certain embodiments, the edge device 216 forwards packets with IP address A to the certificate reputation system 222. In this example, it is assumed that IP address E has not been previously identified as a malicious IP address in the malicious IP address datastore 226. However, the certificate reputation system 222 accesses the certificate/IP address risk datastore 224 and finds that Certificate A has been used before, but is now being used with a different IP. It is, therefore, possible that Certificate A has been provided to more than one entity, and that the entity using IP address E may be malicious. In certain embodiments, the certificate reputation system 222 elevates the security risk level of IP address E and, depending on the reputation security policies implemented by the certificate reputation system 222, places IP address E in the malicious IP address datastore 226. Further, Certificate A may be stored with an elevated security risk level in certificate/IP address risk datastore 224. Communications from server 209 may be intercepted at server 220 or selectively forwarded to one or more of the targeted endpoint devices 214 in accordance with the established policies stored in the network security policies datastore 230.

In certain embodiments, the certificate reputation system 222 may be implemented at the edge device 216, which intercepts and/or forwards communications received from the Internet 212 to one or more targeted endpoint devices 214 over network 218 (e.g., over communication path 240). In certain embodiments, the certificate reputation system 222 is used to establish security policies for IP addresses and digital certificates for use at endpoint devices 210, which are not connected to network 218. Security policies establish for endpoint devices 210 may be enforced by one or more security policy executors 236 running on the endpoint devices 210.

Figure 3:
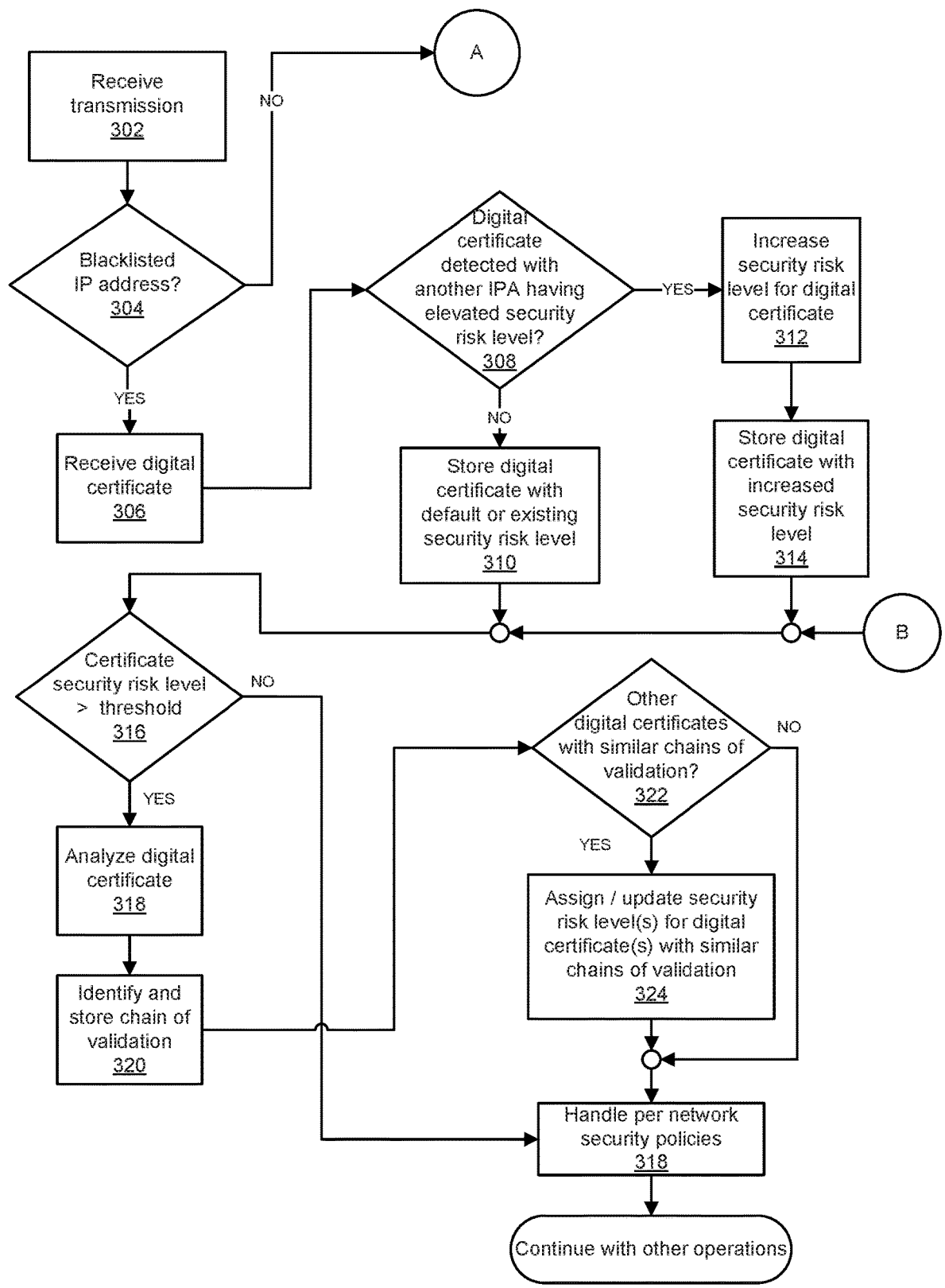
FIG. 3 is a flowchart depicting exemplary operations that may be executed in certain embodiments of the disclosed system if the received transmission includes a blacklisted IP address or other IP address having a high-security risk level.
Figure 4:
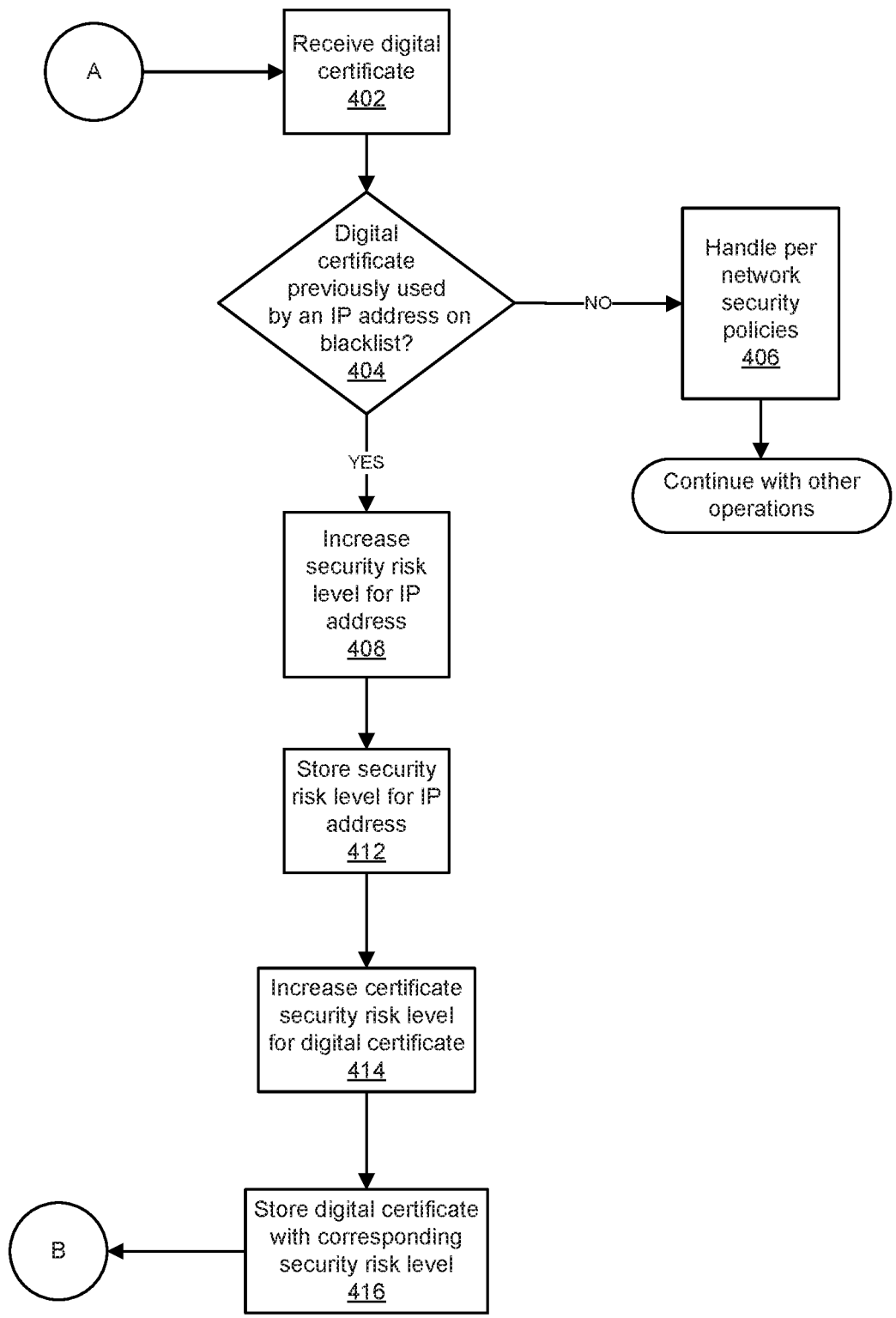
FIG. 4 is a flowchart depicting exemplary operations that may be executed if the received transmission does not use a blacklisted IP address or other IP address having a high-security risk level.

FIG. 3 and FIG. 4 show a flowchart of exemplary operations that may be executed in certain embodiments of the disclosed system. In this example, a transmission is received from, for example, a server at operation 302. At operation 304, a check is made to determine whether the IP address has been blacklisted (or otherwise been designated as a high-security risk address). If the IP address is blacklisted, the digital certificate is received at operation 306, and a determination is made at operation 308 whether the digital certificate has previously been used with another IP address having an elevated security risk level. If the digital certificate has not been used with another IP address having an elevated security risk level, the digital certificate is stored with a default security level, or the current security risk level is maintained at operation 310.

If the digital certificate has been used with another IP address having an elevated security risk level, the security risk level for the digital certificate in certain embodiments may be increased at operation 312 since the use of the digital certificate by multiple IP addresses having high-risk levels indicates that the corresponding digital certificate may present a greater security risk. Certain embodiments store the digital certificate with the increased security risk level at operation 314.

Certain embodiments analyze the characteristics of the digital certificate if the digital certificate has a security risk level above a threshold value. To this end, certain embodiments compare the security risk level of the digital certificate with a threshold value at operation 316. If the security risk level is not greater than the threshold value, the communications are handled per the network's security policies at operation 318. However, if the certificate security risk level is greater than the threshold, certain embodiments begin to analyze the digital certificate at operation 318. In certain embodiments, the digital certificate is analyzed to determine the chain of validation of the digital certificate at operation 320. At operation 322, certain embodiments check whether there are other digital certificates in storage with similar chains of validation. If digital certificates with similar chains of validation are found at operation 322, security risk levels for similar digital certificates are assigned and/or updated at operation 324, and the communications are handled per the network's security policies at operation 318.

FIG. 4 is a flowchart depicting exemplary operations that may be executed if the received transmission does not use a blacklisted IP address (or other IP address having a high-security risk level). In certain embodiments, the digital certificate is received at operation 402, and a check is made at operation 404 to determine whether the digital certificate was previously used by a blacklisted IP address. If the digital certificate has not been previously used by a blacklisted IP address, the communication is handled per the network security policies at operation 406. However, if the digital certificate has previously been used by a blacklisted IP address, certain embodiments increase the security risk level for the IP address at operation 408. Depending on the reputation security policies, the security risk level of the IP address may warrant its placement on the blacklist.

In operation 412, certain embodiments store the security risk level for the IP address for subsequent use. In certain embodiments, the digital certificate security risk level is increased at operation 414 since the digital certificate has now been used by at least two IP addresses having elevated security risk levels. In certain embodiments, the digital certificate is stored with its updated risk level at operation 416 before the digital certificate security risk level is compared to the threshold at operation 316 of FIG. 3.

Figure 5:
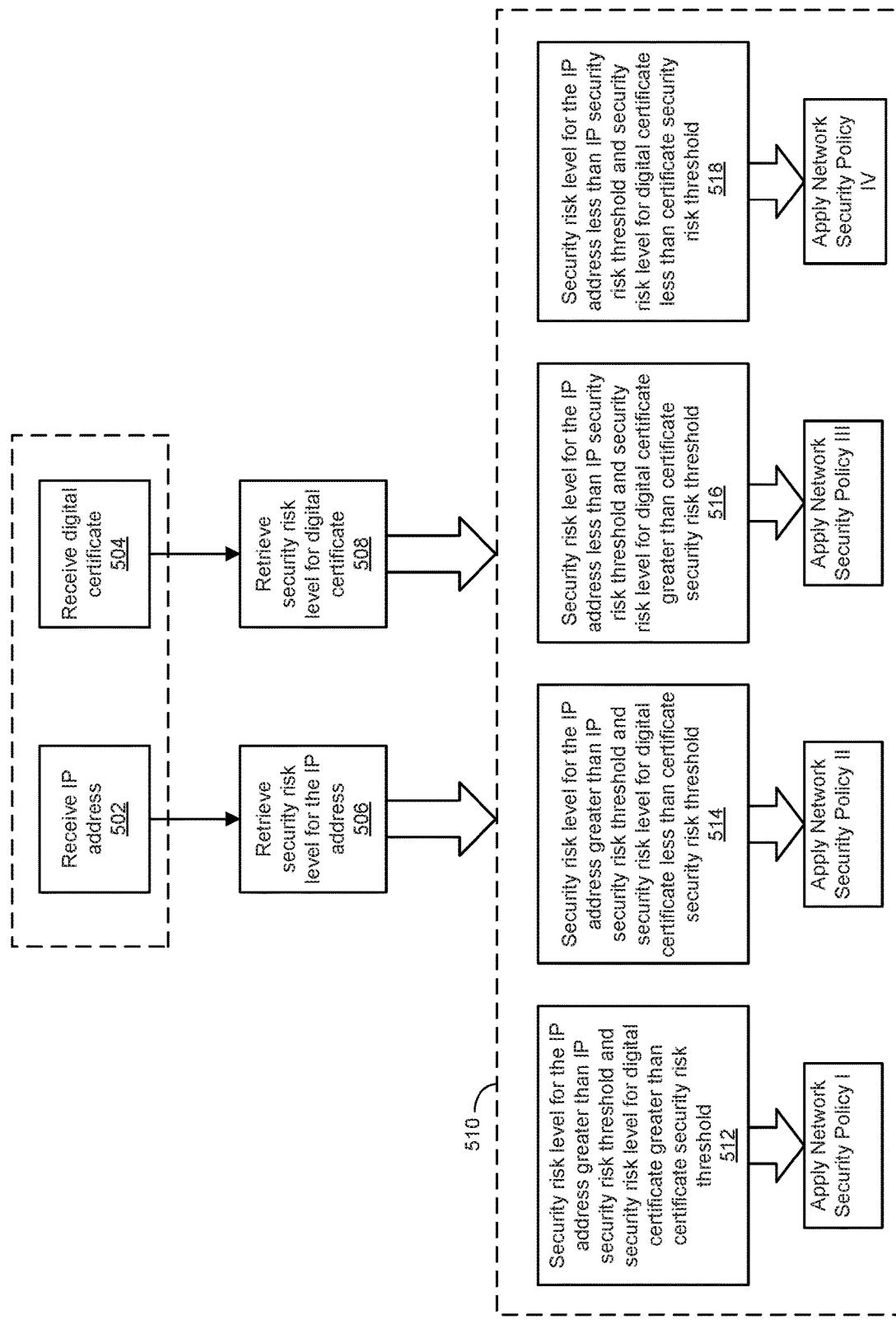
FIG. 5 is a flowchart depicting exemplary operations that may be executed to apply different network security policies in response to receipt of communications using an IP address and digital certificate.

FIG. 5 is a flowchart depicting exemplary operations that may be executed to apply different network security policies in response to receipt of communications using an IP address and digital certificate. In this example, the IP address is received at operation 502, and the digital certificate is received at operation 504. The security risk level for the IP address is retrieved at operation 506, and the security risk level for the digital certificate is retrieved at operation 508. The security risk level for the IP address and the security risk for the digital certificate are compared to respective threshold values at operation 510. In certain embodiments, a single threshold value is applied to the security risk level for the IP address, and another single threshold value is applied to the security risk level for the digital certificate. In such embodiments, the comparisons may result in four mutually exclusive conditions. In this example, a first condition exists at operation 512 when the security risk level for the IP address is greater than the IP security threshold, and the security risk level for the digital certificate is greater than the certificate security threshold. Under the conditions shown at operation 512, Network Security Policy I is applied to the communications. A second condition exists at operation 514 when the security risk level for the IP address is greater than the IP security threshold, and the security risk level for the digital certificate is less than the certificate security threshold. Under the conditions shown at operation 514, Network Security Policy II is applied to the communications. A third condition exists at operation 516 when the security risk level for the IP address is less than the IP security threshold, and the security risk level for the digital certificate is greater than the certificate security threshold. Under the conditions shown at operation 516, Network Security Policy III is applied to the communications. A fourth condition exists at operation 518 when the security risk level for the IP address is less than the IP security threshold, and the security risk level for the digital certificate is less than the certificate security threshold. Under the conditions shown at operation 518, Network Security Policy IV is applied to the communications.

Each network policy may include one or more policy directives. In certain embodiments, the policy directives for the network policies are mutually exclusive so that each network policy includes a unique set of policy directives. In certain embodiments, the policy directives for the network policies may overlap such that more than one network policy is configured to execute some of the same policy directives. It will be recognized, based on the teachings of the present disclosure, that a variety of network policies may be implemented in response to security risk levels for the IP address and/or the digital certificate.

Figure 6:
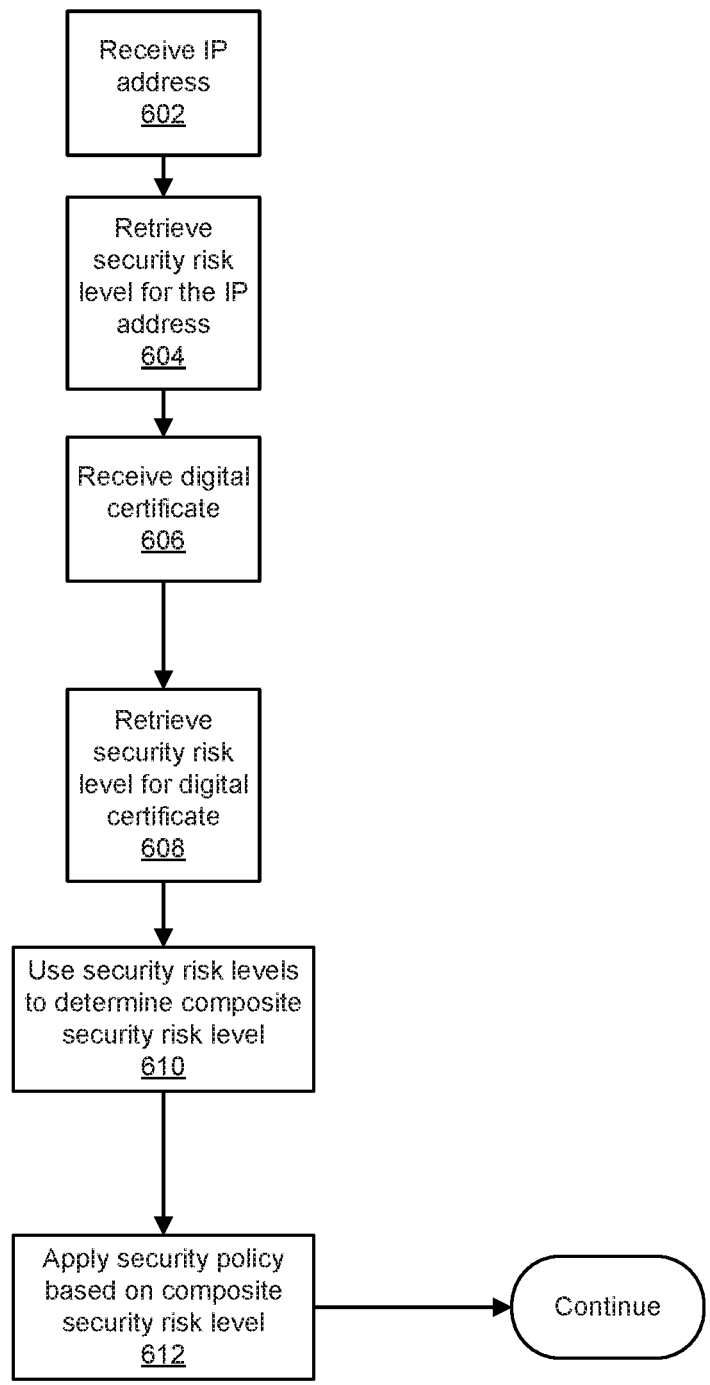
FIG. 6 is a flowchart depicting a further set of exemplary operations that may be executed to apply different network security policies in response to receipt of communications using an IP address and digital certificate.

FIG. 6 is a flowchart depicting a further set of exemplary operations that may be executed to apply different network security policies in response to receipt of communications using an IP address and digital certificate. In this example, the IP address is received at operation 602, and the security risk level for the IP address is retrieved at operation 604. As further shown in this example, the digital certificate is received at operation 606, and the security risk level for the digital certificate is retrieved at operation 608. At operation 610, the security risk levels for the IP address and the digital certificate are used to determine a composite security risk level. In operation 612, the composite security risk level is used to select the security policy that is to be implemented for the communications with the server that is using the IP address.

The composite security risk level may be determined in a number of manners. In one example, the composite security risk level is the average of the IP address security risk level and the digital certificate security risk level. In another example, the composite security risk level is the weighted average of the IP address security risk level and the digital certificate security risk level. In another example, the composite security risk level is determined using a neural network that has been trained to analyze the risk levels of the digital certificate and IP address as the levels affect the overall security risk to the network system.

Figure 7:
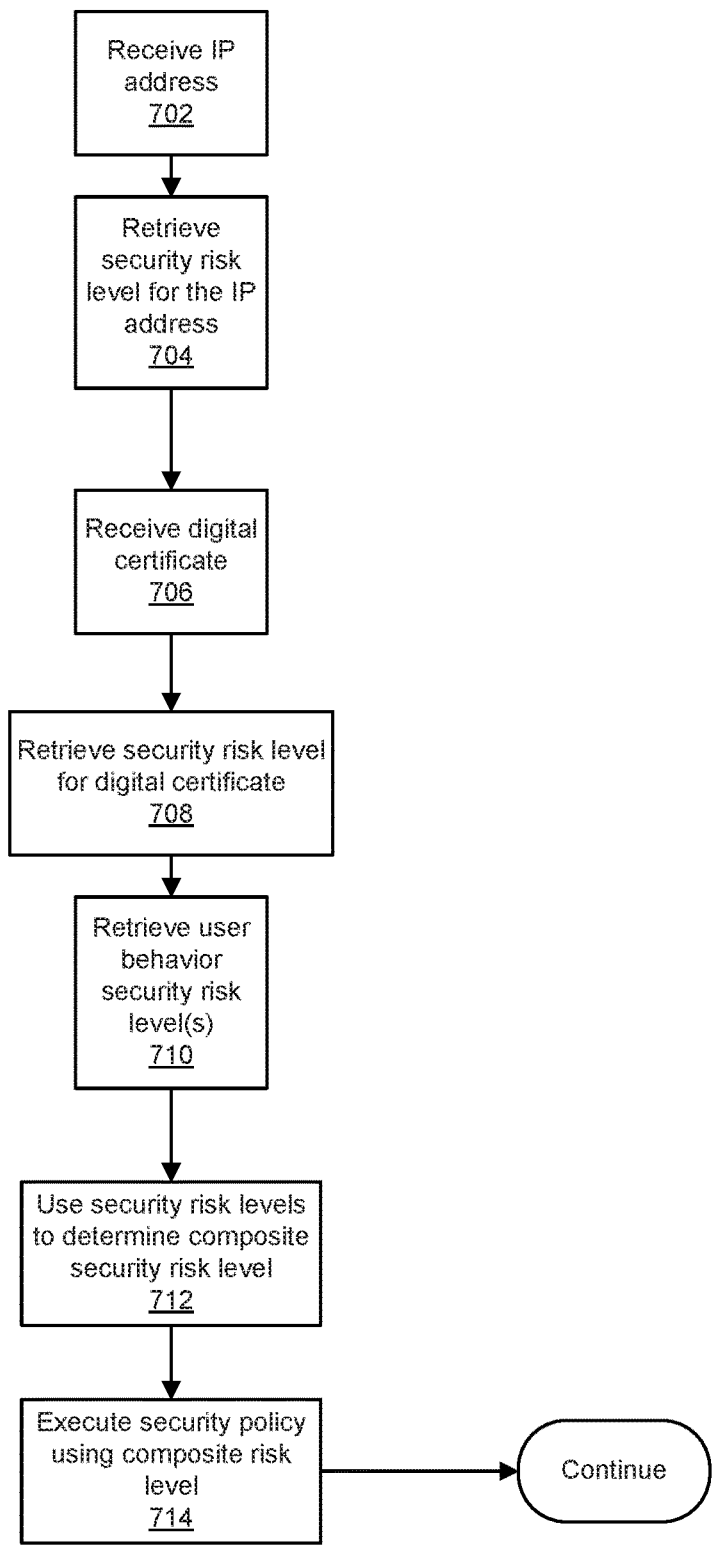
FIG. 7 is a flowchart depicting a further set of exemplary operations that may be executed to apply different network security policies in response to receipt of communications using an IP address and digital certificate.

FIG. 7 is a flowchart depicting a further set of exemplary operations that may be executed to apply different network security policies in response to receipt of communications using an IP address and digital certificate. In this example, the IP address is received at operation 702, and the security risk level for the IP address is retrieved at operation 704. As further shown in this example, the digital certificate is received at operation 706, and the security risk level for the digital certificate is retrieved at operation 708. At operation 710, the behavior security risk level for the user operating the targeted endpoint is retrieved. In certain embodiments, the behavior security risk level is provided as a single value that has been composited from various behaviors exercised by the user. In certain embodiments, the user behavior security risks are presented as a vector in multi-dimensional behavior space. At operation 712, the security risk levels for the IP address, the digital certificate, and the user behavior are used to determine a composite security risk level. In operation 714, the composite security risk level is used to select the security policy that is to be implemented for the communications with the server that is using the IP address.

The composite security risk level may be determined at operation 712 in a number of manners. In one example, the composite security risk level is the average of the IP address security risk level, the digital certificate security risk level, and the user behavior security risk level. In another example, the composite security risk level is the weighted average of the IP address security risk level, the digital certificate security risk level, and the user behavior security risk level. In another example, the composite security risk level is determined using a neural network that has been trained to analyze the risk levels of the digital certificate, IP address, and user behavior as the levels affect the overall security risk to the network system.

As will be appreciated by one skilled in the art, the disclosed system may be embodied as a method, system, or computer program product. Accordingly, embodiments of the disclosed system may be implemented entirely in hardware, entirely in software (including firmware, resident software, micro-code, etc.) or in an embodiment combining software and hardware. These various embodiments may all generally be referred to herein as a "circuit," "module," or "system." Furthermore, the disclosed system may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object-oriented programming language such as Java, Smalltalk, C++ or the like. However, the computer program code for carrying out operations of the disclosed system may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosed system are described with reference to flowchart illustrations and/or block diagrams of methods, apparatus (systems) and computer program products according to embodiments of the disclosed system. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed system. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the disclosed system have been shown and described, it will be evident to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation, no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The disclosed system is well adapted to attain the advantages mentioned as well as others inherent therein. While the disclosed system has been depicted, described, and is defined by reference to particular embodiments of the disclosed system, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for executing one or more security policies in a secured network, comprising:
   receiving a communication including an Internet protocol (IP) address and a digital certificate at a device within the secured network, the IP address having an IP address security risk level, the digital certification having a digital certificate security risk level;
   determining whether the IP address security risk level is identified as having a high-security risk level;
   if the IP address has a high-security risk level, assigning a security risk level to the digital certificate based on the security risk level of the IP address;
   using the security risk level for the IP address and the security risk level for the digital certificate in executing the one or more security policies, the one or more security policies comprising one or more reputation security policies, executing the one or more reputation security policies is based upon the security risk level for the IP address and the security risk level for the digital certificate; and,
   if the digital certificate is associated with an IP address having a high-security risk level,
      analyzing the digital certificate to identify one or more digital certificate characteristics; and
      analyzing other digital certificates to determine whether other digital certificates have one or more of the same digital certificate characteristics.

2. The computer-implemented method of claim 1, wherein
   the one or more security policies assign different weights to the security risk level of the IP address and the security risk level of the digital certificate to determine an appropriate security response.

3. The computer-implemented method of claim 1, further comprising:
   determining whether the IP address has a high-security risk includes determining whether the IP address is on a blacklist of IP addresses; and
   assigning a high-security risk level to the digital certificate if the IP address is on the blacklist of IP addresses.

4. The computer-implemented method of claim 1, further comprising:
   retrieving a user behavior security risk level corresponding to security risk presented by a user, wherein the user is an intended recipient of the communication; and
   using the security risk level for the IP address, the security risk level for the digital certificate, and the user behavior security risk level for the user to execute one or more security policies.

5. The computer-implemented method of claim 1, further comprising:
   increasing a security risk level of the IP address if the digital certificate has been previously used with one or more IP addresses presenting an elevated security risks.

6. The computer-implemented method of claim 1, further comprising:
   assigning an elevated security risk level to the other digital certificates having one or more of the same digital certificate characteristics.

7. A system comprising:
   one or more information handling systems, wherein the one or more information handling systems include:
      a processor;
      a data bus coupled to the processor; and
      a non-transitory, computer-readable storage medium embodying computer program code, the non-transitory, computer-readable storage medium being coupled to the data bus;
      wherein the computer program code included in one or more of the information handling systems is executable by the processor of the information handling system so that the information handling system, alone or in combination with other information handling systems, executes operations comprising:
         receiving a communication including an Internet protocol (IP) address and a digital certificate at a device within the secured network, the IP address having an IP address security risk level, the digital certification having a digital certificate security risk level;
         determining whether the IP address is identified as having a high-security risk level, the determining being based upon the associated reputation of the digital certificate;
         if the IP address has a high-security risk level, assigning a security risk level to the digital certificate based on the security risk level of the IP address;
         using the security risk level for the IP address and the security risk level for the digital certificate in executing the one or more security policies, the one or more security policies comprising one or more reputation security policies, executing the one or more reputation security policies is based upon the security risk level for the IP address and the security risk level for the digital certificate; and,
         if the digital certificate is associated with an IP address having a high-security risk level, analyzing the digital certificate to identify one or more digital certificate characteristics; and analyzing other digital certificates to determine whether other digital certificates have one or more of the same digital certificate characteristics.

8. The system of claim 7, wherein
the one or more security policies assign different weights to the security risk level of the IP address and the security risk level of the digital certificate to determine an appropriate security response.

9. The system of claim 7, wherein
determining whether the IP address has a high-security risk includes determining whether the IP address is on a blacklist of IP addresses; and assigning a high-security risk level to the digital certificate if the IP address is on the blacklist of IP addresses.

10. The system of claim 7, wherein the computer program code is further configured for:
retrieving a user behavior security risk level corresponding to security risk presented by a user, wherein the user is an intended recipient of the communication; and using the security risk level for the IP address, the security risk level for the digital certificate, and the user behavior security risk level for the user to execute one or more security policies.

11. The system of claim 7, wherein the computer program code is further configured for:
increasing a security risk level of the IP address if the digital certificate has been previously used with one or more IP addresses presenting elevated security risks.

12. The system of claim 7, wherein the computer program code is further configured for:
assigning an elevated security risk level to the other digital certificates having one or more of the same digital certificate characteristics.

13. A non-transitory, computer-readable storage medium embodying computer program code, the computer program code comprising computer-executable instructions configured for:
receiving a communication including an Internet protocol (IP) address and a digital certificate at a device within the secured network, the IP address having an IP address security risk level, the digital certification having a digital certificate security risk level;

determining whether the IP address security risk level is identified as having a high-security risk level;

if the IP address has a high-security risk level, assigning a security risk level to the digital certificate based on the security risk level of the IP address;

using the security risk level for the IP address and the security risk level for the digital certificate in executing the one or more security policies, the one or more security policies comprising one or more reputation security policies, executing the one or more reputation security policies is based upon the security risk level for the IP address and the security risk level for the digital certificate; and, if the digital certificate is associated with an IP address having a high-security risk level, analyzing the digital certificate to identify one or more digital certificate characteristics; and analyzing other digital certificates to determine whether other digital certificates have one or more of the same digital certificate characteristics.

14. The non-transitory, computer-readable storage medium of claim 13, wherein
the one or more security policies assign different weights to the security risk level of the IP address and the security risk level of the digital certificate to determine an appropriate security response.

15. The non-transitory, computer-readable storage medium of claim 13, wherein
determining whether the IP address has a high-security risk includes determining whether the IP address is on a blacklist of IP addresses; and assigning a high-security risk level to the digital certificate if the IP address is on the blacklist of IP addresses.

16. The non-transitory, computer-readable storage medium of claim 13, wherein the instructions are further configured for:
retrieving a user behavior security risk level corresponding to security risk presented by a user, wherein the user is an intended recipient of the communication; and using the security risk level for the IP address, the security risk level for the digital certificate, and the user behavior security risk level for the user to execute one or more security policies.

17. The non-transitory, computer-readable storage medium of claim 13, wherein the instructions are further configured for:
increasing a security risk level of the IP address if the digital certificate has been previously used with one or more IP addresses presenting an elevated security risk.

* * * * *